US009886049B2

(12) United States Patent
Qing et al.

(10) Patent No.: US 9,886,049 B2
(45) Date of Patent: Feb. 6, 2018

(54) LOW DROP-OUT VOLTAGE REGULATOR AND METHOD FOR TRACKING AND COMPENSATING LOAD CURRENT

(71) Applicant: NXP B.V., Eindhoven (NL)

(72) Inventors: Jiam Qing, Shanghai (CN); Ming Liang Wan, Shanghai (CN); Shuiwen Huang, Shanghai (CN)

(73) Assignee: NXP USA, INC., Austin, TX (US)

( * ) Notice: Subject to any disclaimer, the term of this patent is extended or adjusted under 35 U.S.C. 154(b) by 18 days.

(21) Appl. No.: 15/289,983

(22) Filed: Oct. 11, 2016

(65) Prior Publication Data

US 2017/0115678 A1 Apr. 27, 2017

(30) Foreign Application Priority Data

Oct. 23, 2015 (CN) .......................... 2015 1 0695445

(51) Int. Cl.
*G05F 1/00* (2006.01)
*G05F 1/573* (2006.01)
*H02H 7/00* (2006.01)
*H02H 9/00* (2006.01)
*G05F 1/575* (2006.01)

(52) U.S. Cl.
CPC .................................... *G05F 1/575* (2013.01)

(58) Field of Classification Search
CPC .......... G05F 1/461; G05F 1/462; G05F 1/562; G05F 1/573; G05F 1/575
USPC .................... 323/274–277, 284, 285; 361/18
See application file for complete search history.

(56) References Cited

U.S. PATENT DOCUMENTS 7,902,801 B2 3/2011 Mandal
8,089,261 B2 1/2012 Lipka
8,169,203 B1 5/2012 Vemula
2007/0194768 A1* 8/2007 Bansal .................... G05F 1/573 323/277

(Continued)

FOREIGN PATENT DOCUMENTS

CN 102981544 3/2013
CN 102999074 3/2013

OTHER PUBLICATIONS

Ka Chun Kwok and Philip K.T. Mok, "Pole-Zero Tracking Frequency Compensation for Low Dropout Regulator", IEEE 0-7803-7448-7/02, 2002.

(Continued)

*Primary Examiner* — Gary Nash
(74) *Attorney, Agent, or Firm* — Charles E. Bergere

(57) ABSTRACT

A low drop-out voltage regulator includes an error amplifier having a non-inverting input, an inverting input and an output. One of the non-inverting and inverting inputs is connected to a reference voltage. An output circuit is connected by way of the output of the error amplifier to an external load. The output circuit generates an output current and an output voltage for the external load. A current tracking circuit is coupled to the output circuit and receives the output current and generates a tracking current that tracks the output current. A load tracking-compensation circuit is coupled to the current tracking circuit and the output circuit, and generates a control voltage based on the tracking current and provides the control voltage to the output circuit.

18 Claims, 7 Drawing Sheets

(56) References Cited

U.S. PATENT DOCUMENTS

| | | | | |
|---|---|---|---|---|
| 2008/0203983 | A1* | 8/2008 | Lo Lacono | G05F 1/565 323/266 |
| 2010/0156379 | A1* | 6/2010 | Marino | G01R 19/16552 323/293 |
| 2013/0119954 | A1* | 5/2013 | Lo | G05F 1/575 323/280 |
| 2013/0293986 | A1* | 11/2013 | Lerner | G05F 1/573 361/18 |
| 2015/0248136 | A1 | 9/2015 | Bhattad et al. | |
| 2015/0263683 | A1 | 9/2015 | Kronmueller et al. | |

OTHER PUBLICATIONS

Ka Nang Leung and Philip K.T. Mok, "Analysis of Multistage Amplifier-Frequency Compensation", IEEE Transactions on Circuits and Systems-I: Fundamental Theory and Applications, vol. 48., No. 9, Sep. 2001.

* cited by examiner

LOW DROP-OUT VOLTAGE REGULATOR AND METHOD FOR TRACKING AND COMPENSATING LOAD CURRENT

BACKGROUND

The present invention generally relates to a low drop-out voltage regulator and, more particularly, to a voltage regulator that tracks and compensates load current, and a corresponding method for tracking and compensating load current.

High performance power supplies use low drop-out voltage regulators (LDO) as power converters for their improved efficiency and reduced noise. For these reasons, LDOs also are widely used in various devices like mobile phones, electronic instruments, portable computers, etc.

A typical LDO includes an error amplifier, an output stage, and a sampling and feedback circuit. The sampling and feedback circuit samples an output voltage provided by the output stage, and feeds back to the error amplifier, such that a voltage feedback loop is formed to ensure a stable output of the LDO.

In operation, the output current of the LDO varies with connected loads. Specifically, in some of the applications, variations in load are remarkable such that the output current fluctuates beyond the range of stable operation. Further, mutual interference exists between the load and the intrinsic control loop of the LDO, which effects the frequency response and output stability of the LDO.

The present invention provides a low drop-out voltage regulator with improved output stability along with actual load current variations. The present invention also provides a corresponding method for a low drop-out voltage regulator to track and compensate load current.

SUMMARY

This summary is provided to introduce a selection of concepts in a simplified form that are further described below in the Detailed Description. This summary is not intended to identify key or essential features of the claimed subject matter, nor is it intended to be used to limit the scope of the claimed subject matter.

A low drop-out voltage regulator includes an error amplifier comprising a non-inverting input terminal, an inverting input terminal and an output terminal, one of the non-inverting input terminal and the inverting input terminal being connected to a reference voltage; an output circuit connecting the output terminal of the error amplifier to an external load and that generates an output current and an output voltage for the external load; a current tracking circuit coupled to the output circuit and that receives the output current and generates a tracking current that tracks the output current; and a load tracking-compensation circuit coupled to the current tracking circuit and the output circuit, and that generates a control voltage based on the tracking current and provides the control voltage to the output circuit.

A method for tracking and compensating load current of a low drop-out voltage regulator, wherein the low drop-out voltage regulator comprises an error amplifier and an output circuit. The method includes receiving an output current of the output circuit, and generating a tracking current which tracks the output current, and generating a control voltage according to the tracking current, and providing the control voltage to the output circuit.

The described low drop-out voltage regulator and its method for tracking and compensating load current adaptably adjust the compensation for the output circuit according to dynamic load current variations, which enables improvement of the frequency response, and further stables the operation of the LDO in connecting large or small loads.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments. Advantages of the subject matter claimed will become apparent to those skilled in the art upon reading this description in conjunction with the accompanying drawings, in which like reference numerals have been used to designate like elements, and in which:

DETAILED DESCRIPTION

Figure 1:
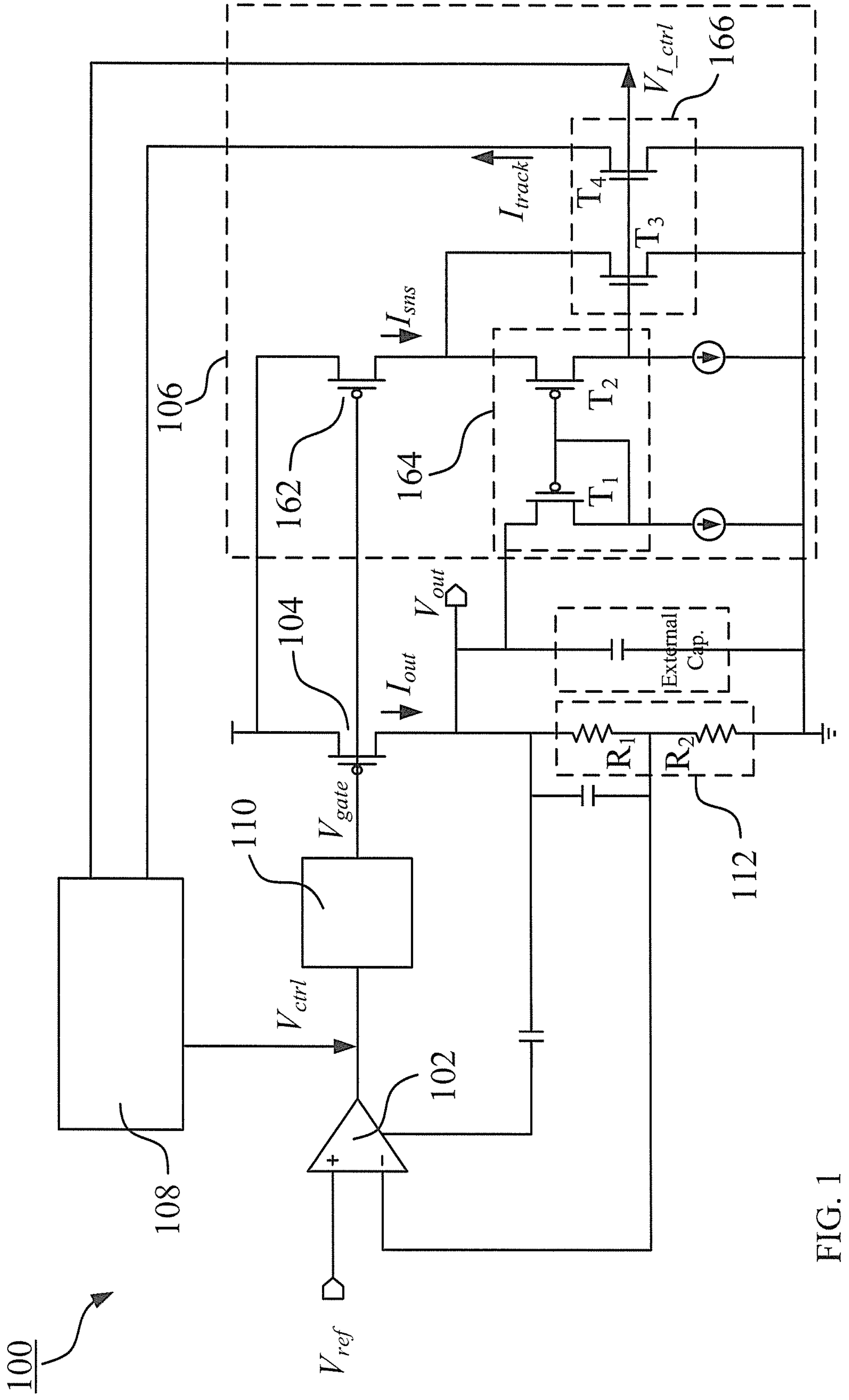
FIG. 1 is a schematic circuit diagram of a low drop-out voltage regulator (LDO) in accordance with an embodiment of the present invention.

FIG. 1 is a schematic circuit diagram of a low drop-out voltage regulator 100 in accordance with an embodiment. The low drop-out voltage regulator (LDO) 100 includes an error amplifier 102, an output circuit 104, a current tracking circuit 106, and a load tracking compensation circuit 108.

The error amplifier 102 includes a non-inverting input terminal, an inverting input terminal and an output terminal. The non-inverting input terminal is coupled to a reference voltage $V_{ref}$, and the output terminal is coupled to the output circuit 104.

In one embodiment, the reference voltage $V_{ref}$ is provided by a band-gap reference voltage source (not shown), which can be implemented in various known ways.

The output circuit 104 is connected to the output terminal of the error amplifier 102 and receives an output of the error amplifier 102. The output circuit 104 provides a corresponding output current and output voltage accordingly. The output current $I_{out}$ and the output voltage $V_{out}$ of the output circuit 104 are provided to external loads as the output current and output voltage of the LDO 100.

In one embodiment, the output circuit 104 is implemented as a transistor, e.g., a MOS transistor. A gate terminal of the transistor is connected to the output terminal of the error amplifier 102 to receive the output of the error amplifier 102 and take it as a gate voltage $V_{gate}$ of the transistor. As a result, a source terminal or a drain terminal of the transistor can be output as the output current $I_{out}$ and output voltage $V_{out}$ of the LDO 100.

Still referring to FIG. 1, in one embodiment, a buffer stage circuit 110 is connected between the error amplifier 102 and the output circuit 104. The buffer stage circuit 110 buffers and/or amplifies the output of the error amplifier 102. It will be appreciated by those of skill in the art that the buffer stage circuit 110 is optional and is not necessarily included in the structure of the LDO 100.

A voltage feedback circuit 112 is coupled between the output of the output circuit 104 and the inverting input terminal of the error amplifier 102. The voltage feedback circuit 112 receives the output voltage $V_{out}$ of the output circuit 104 and samples the output voltage $V_{out}$. The voltage feedback circuit 112 provides the sampled voltage to the inverting input terminal of the error amplifier 102. A closed loop feedback is formed through the voltage feedback circuit 112 accordingly.

In one embodiment, the voltage feedback 112 is implemented as a serial connection of resistors R1 and R2. A node between the resistors R1 and R2 is coupled to the inverting input terminal of the error amplifier 102.

It will be understood by those of skill in the art that the non-inverting input terminal and the inverting input terminal of the error amplifier 102 can be interchanged while not necessarily configured as shown in FIG. 1.

The current tracking circuit 106 includes a current mirror circuit 162, an amplifier circuit 164, and a track generation circuit 166. In one embodiment, the current mirror circuit 162 comprises a transistor having the same or proportional parameters as the transistor of the output circuit 104. The transistor of the current mirror circuit 162 is connected to be a mirror of the transistor of the output circuit 104, such that a sensing current $I_{sns}$, which is a mirror of the output current $I_{out}$ is provided at one of a source terminal or a drain terminal of the transistor of the current mirror circuit 162.

One terminal of the amplifier circuit 164 is connected to the output terminal of the current mirror circuit 162 for receiving the sensing current $I_{sns}$ provided by the current mirror circuit 162. The amplifier circuit 164 generates a corresponding feedback-control voltage accordingly. In one embodiment, the amplifier circuit 164 includes two transistors T1 and T2 having the same parameters. Gate terminals of the transistors T1 and T2 are coupled to each other, one of a source terminal and a drain terminal of the transistor T1 is connected to a terminal of the transistor of the output circuit 104, which provides the output voltage $V_{out}$, while the other is coupled to the gate terminal of the transistor T1. One of a source terminal and a drain terminal of the transistor T2 is connected to the output terminal of the current mirror circuit 162, which provides the sensing current $I_{sns}$, while the other is configured to output the feedback-control voltage. The feedback-control voltage provided by the amplifier circuit 164 reflects the sensing current $I_{sns}$, such that the feedback-control voltage can be used for the current feedback loop of the LDO 100.

The track generation circuit 166 is connected to the output terminal of the current mirror circuit 162 for receiving the sensing current $I_{sns}$. The track generation circuit 166 is configured to provide a tracking current $I_{track}$ for the load tracking compensation circuit 108. It will be appreciated by those of skill in the art that the tracking current $I_{track}$ reflects of the current output of the LDO 100 in its operation where a load is connected.

In one embodiment, the track generation circuit 166 includes transistors T3 and T4 having gate terminals connected together. The gate terminal of the transistor T3 is coupled to a terminal of the amplifier 164 where the feedback-control voltage is provided, and coupled to the gate terminal of the transistor T4, so that the feedback-control voltage $V_{I\_ctrl}$ drawn through the gates of the transistors T3 and T4, and further provided to the current feedback loop of the LDO 100. One of a source terminal and a drain terminal of the transistor T3 is coupled to the output of the current mirror circuit 162 for receiving the sensing current $I_{sns}$. The transistor T4 is connected as a mirror of the transistor T3 such that the tracking current $I_{track}$, which is a mirror of the sensing current $I_{sns}$ is provided by one of a source terminal or a drain terminal of the transistor T4, which is a mirror of the terminal of the transistor T3 connected to the output of the current mirror circuit 162.

The load tracking compensation circuit 108 is connected between the current tracking circuit 106 and the output circuit 104. The load tracking compensation circuit 108 receives the tracking current $I_{track}$ and a feedback-control voltage $V_{I\_ctrl}$, and provides a control voltage $V_{ctrl}$ to the output circuit 104. In a presently preferred embodiment, the control voltage $V_{ctrl}$ is provided to the output circuit 104 by way of the buffer stage circuit 110. The load tracking compensation circuit 108 adaptively adjusts the control voltage $V_{ctrl}$ based on the output current of the LDO 100 in conditions where loads are connected, and so adaptively adjusts a compensation to the primary stage circuit of the LDO so that the LDO 100 is very robust against load variations.

Figure 2:
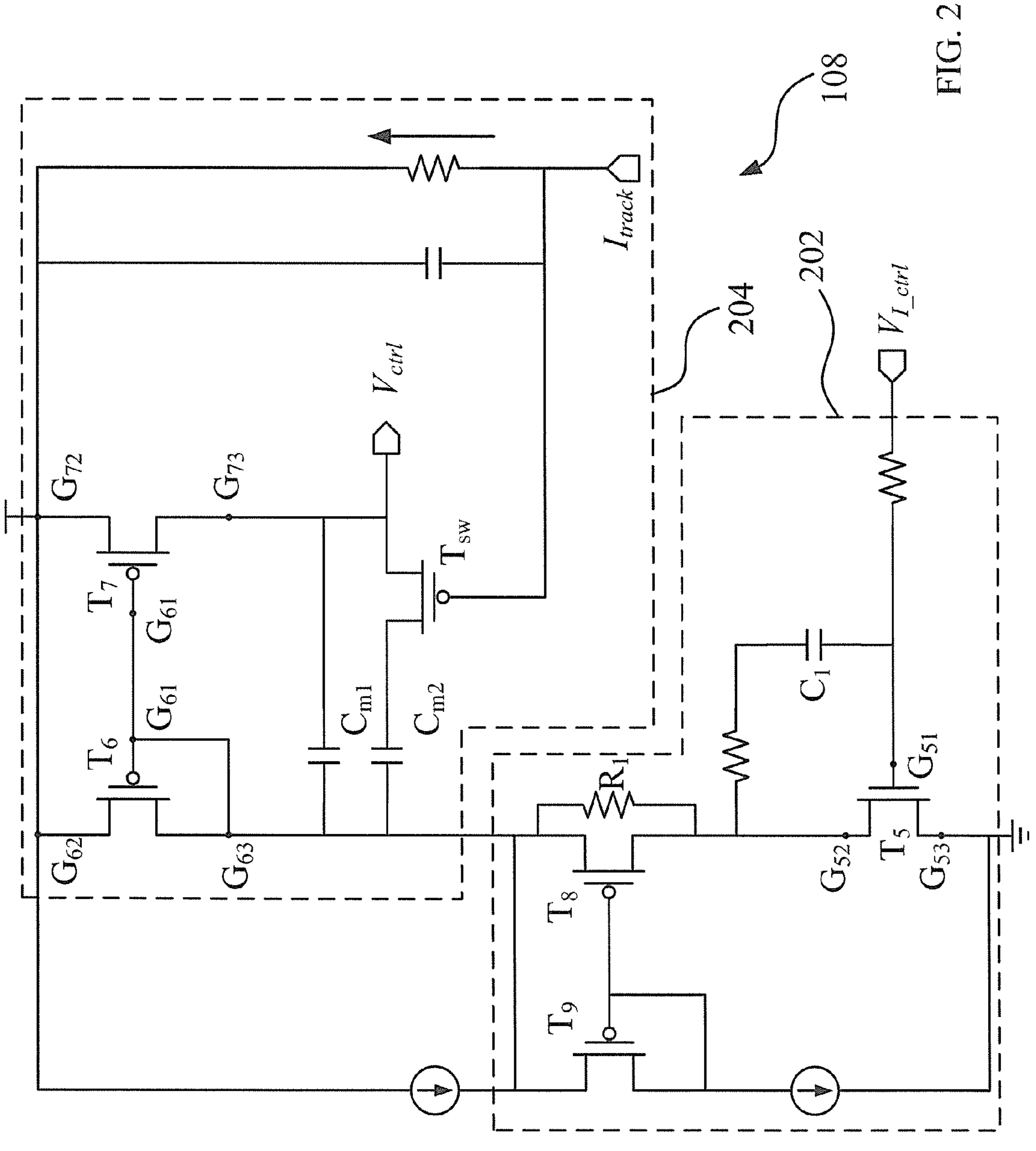
FIG. 2 is a schematic circuit diagram of a load tracking-compensation circuit of an LDO according to an embodiment of the present invention.

Referring to FIG. 2, a schematic diagram of the load tracking compensation circuit 108 in accordance with an embodiment of the present invention is shown.

The load tracking-compensation circuit 108 includes a current feedback circuit 202, and a current compensation circuit 204. The current feedback circuit 202 receives the feedback-control voltage $V_{I\_ctrl}$ (as shown in FIG. 1) and provides the current feedback loop of the LDO 100 with the control voltage $V_{ctrl}$. The current compensation circuit 204 receives the tracking current $I_{track}$ and compensates for load current variations of the LDO through the control voltage $V_{ctrl}$.

In the embodiment illustrated in FIG. 2, the current feedback circuit 202 includes a feedback transistor T5 with connection nodes G51, G52 and G53, where the connection node G51 is a gate node, and connection nodes G52 and G53 are respectively one of a source node and a drain node. The gate node G51 is connected to receive the feedback-control voltage $V_{I\_ctrl}$. A capacitor C1 is coupled between the gate node G51 and the connection node G52, which forms a current feedback loop based on the feedback-control voltage $V_{I\_ctrl}$. The current feedback circuit 202 enables output stability of the LDO 100 by using the control voltage $V_{ctrl}$. It will be understood by those of skill in the art that the connection of the transistor T5 and the capacitor C1 forms a Miller compensation circuit, which compensates for the frequency response of the LDO based on the feedback-control voltage $V_{I\_ctrl}$.

The current compensation circuit 204 includes a first capacitor $C_{m1}$, a second capacitor $C_{m2}$, and a switching element $T_{sw}$. The first capacitor $C_{m1}$ is coupled between the output terminal of the current feedback circuit 202 and the control voltage $V_{ctrl}$ on the output terminal of the load tracking-compensation circuit 108. The second capacitor $C_{m2}$ is connected in series with the switching element $T_{sw}$ before being connected in parallel to the first capacitor $C_{m1}$. The switching element $T_{sw}$ receives the tracking current $I_{track}$, and controls the parallel connection of the second and first capacitors $C_{m2}$ and $C_{m1}$ accordingly. As shown in FIG. 2, the switching element $T_{sw}$ is implemented with a switching transistor. A gate terminal of the switching transistor is coupled to the track generation circuit (FIG. 1) and receives the tracking current $I_{track}$. The switching transistor is switched on or off by the tracking current $I_{track}$, so that the connected second capacitor $C_{m2}$ connects or disconnects to the first capacitor $C_{m1}$. It is noted that the switching element $T_{sw}$ can comprises other types of switching elements or other controllable switching circuits, while not being limited to the switching transistor shown in FIG. 2.

The current compensation circuit 204 further includes transistors T6 and T7 having gate terminals connected together. The transistor T6 includes connection nodes G61, G62, and G63, where G61 is a gate node and G62 and G63 are respectively one of a source node and a drain node thereof. The transistor T7 includes connection nodes G71, G72, and G73, where G71 is a gate node, and G72 and G73 are respectively one of a source node and a drain node. The connection nodes G62 and G72 of the transistors T6 and T7 are each coupled to receive the tracking current $I_{track}$. The parallel connection of the first capacitor $C_{m1}$ and second capacitor $C_{m2}$ is coupled between connection nodes G63 and G73 of the transistors T6 and T7. The connection nodes G63 and G61 of the transistor T6 are connected together. An output connection node G73 of the transistor T7 is connected to the control voltage $V_{ctrl}$ provided by the load tracking-compensation circuit 108.

According to the current compensation circuit 204, a capacitor comprising the first and second capacitors $C_{m1}$ and $C_{m2}$ composes a Miller compensation network together with the transistors T6 and T7, with a capacitance of the first capacitor $C_{m1}$ or a capacitance of the parallel connection of the capacitors $C_{m1}$ and $C_{m2}$ being the Miller capacitance of the Miller compensation network.

According to the described LDO 100, a transfer function of the system is:

$$A(s) \approx \frac{A}{\left(1 + \varepsilon * \frac{s}{\omega} + \frac{s^2}{\omega^2}\right)}$$

wherein A is the loop gain, $\epsilon$ is the damping coefficient, $\omega$ is the Conjugate pole-frequency, while s is the s-domain frequency.

The damping coefficient $\epsilon$ can be expressed as:

$$\varepsilon \propto \sqrt{\frac{C_m}{I_{out}}}$$

wherein, $I_{out}$ is the output current of the LDO, and $C_m$ is the Miller capacitance of the Miller compensation network.

It can be seen that, when the load increases and thereby increases the load current, the switching element $T_{sw}$ is conductive so that a capacitance connected to the control voltage $V_{ctrl}$ node at the output terminal increases, the damping coefficient can be held at a relatively stable level so the loop is very stable.

The current feedback circuit 202 further includes a transistor T8 coupled between the feedback transistor T5 and the current compensation circuit 204. One of a source terminal and a drain terminal of the transistor T8 is connected to the current compensation circuit 204, while the other is connected to the connection node G52 of the feedback transistor T5. A resistor R1 is connected between the source terminal and the drain terminal of the transistor T8. As described above, connection of the transistor T5 and the capacitor C1 forms a Miller compensation circuit, the gain thereof is:

$$A_v = g_m \cdot R_{out}$$

wherein, $A_v$ is the gain of the Miller compensation circuit, $g_m$ is the transconductance, and $R_{out}$ is the external impedance. It can be seen that the gain of the current feedback circuit 202 is impacted to a large extent by the external impedance connected to the capacitor C1, e.g., the impedance of the current compensation circuit 204 or especially the transistor T6 thereof. On the other hand, the gate connection of the transistor T6 results in a reverse-connected diode like circuit, such that the impedance of the current compensation circuit 204 is limited. Accordingly it is possible that the gain of the current feedback circuit 202 will not result in predetermined outcome. The transistor T8 can increase the external impedance of a Miller compensation circuit formed by the transistor T5 and the capacitor C1, and improve the gain of the current feedback circuit 202.

The current feedback circuit 202 further includes a transistor T9 having a gate terminal connected to the gate of the transistor T8 so that the transistor T8 operates in its saturation zone, which ensures the impedance of the transistor T8. It can be expected that, as the control current $I_{ctrl}$ increases, the transistor T8 will go into its linear zone while the impedance thereof will no longer be sustained. The resistor R1 connected between the source terminal and the drain terminal of the transistor T8 is able to clamp the source-drain voltage, so that the transistor T8 operates in its saturation zone and ensures its impedance.

Figure 3:
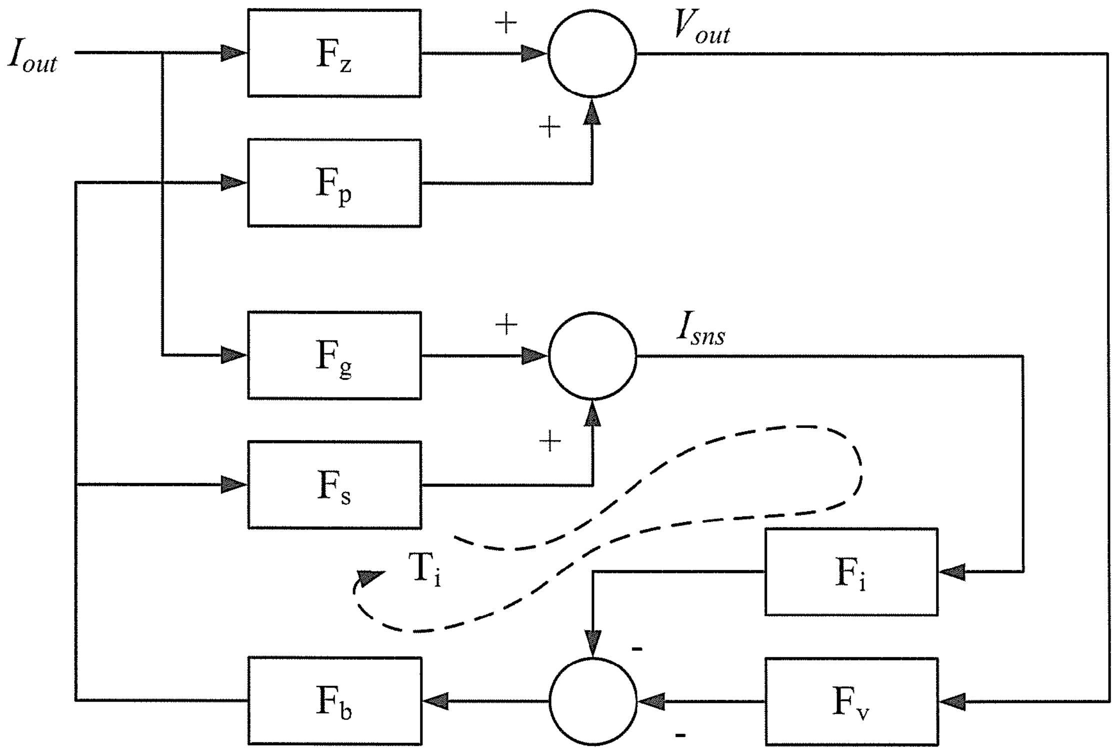
FIG. 3 is a small-signal model of an LDO with load current tracking and compensation according to an embodiment of the present invention.

With reference to FIG. 3, which shows a small-signal model of the LDO 100 with load current tracking and compensation according to the present invention, $F_z$ stands for a gain block from the output current $I_{out}$ to the output voltage $V_{out}$, $F_p$ stands for a gain block from the control voltage $V_{ctrl}$ to the output voltage $V_{out}$, $F_g$ stands for a gain block from the output current $I_{out}$ to the sensing current $I_{sns}$, and Fs stands for a gain block from the control voltage $V_{ctrl}$ to the sensing current $I_{sns}$. Besides the voltage feedback loop expressed by $F_y$ and fed back from the output voltage $V_{out}$, the embodiment of the present invention includes the tracking and compensation to the output current $I_{out}$ through a feedback loop $T_i$ (shown with dashed lines) from the sampled current $I_{sns}$ to the control voltage $V_{ctrl}$ (expressed by $F_i$). Due to the control of the tracking current $I_{track}$, the capacitor $C_{m2}$ is operably connected or disconnected, thereby a Miller capacitance composed by the capacitor $C_{m2}$ and the $C_{m1}$ is adjustable. In such a way, when the LDO 100 is connected with a relatively large load, the risk of the generated sub-harmonic oscillation in the current loop can be eliminated and further, negative impact on voltage loop stability when a light load is connected also is relieved or negligible.

Figure 4:
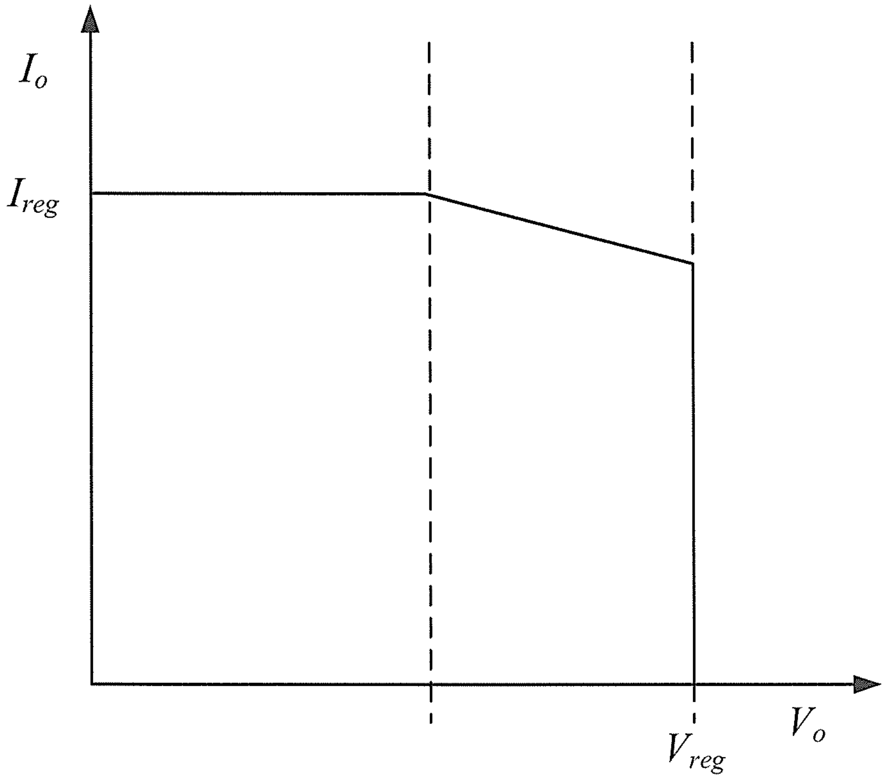
FIG. 4 is a graph of an exemplary DC function waveform of an LDO according to an embodiment of the present invention.

FIG. 4 is a graph shown an exemplary DC function waveform of an LDO according to an embodiment of the present invention. As can be seen, when the load current is below the maximum operation limit, voltage loop adjustment dominates in the circuit. As the load current increases and exceeds the safe operating area (SOA), current loop adjustment will dominate in the circuit, and there's a clamp of maximum output current. In conditions between normal operation and SOA, there's both voltage loop and current loop adjustments.

Figure 5:
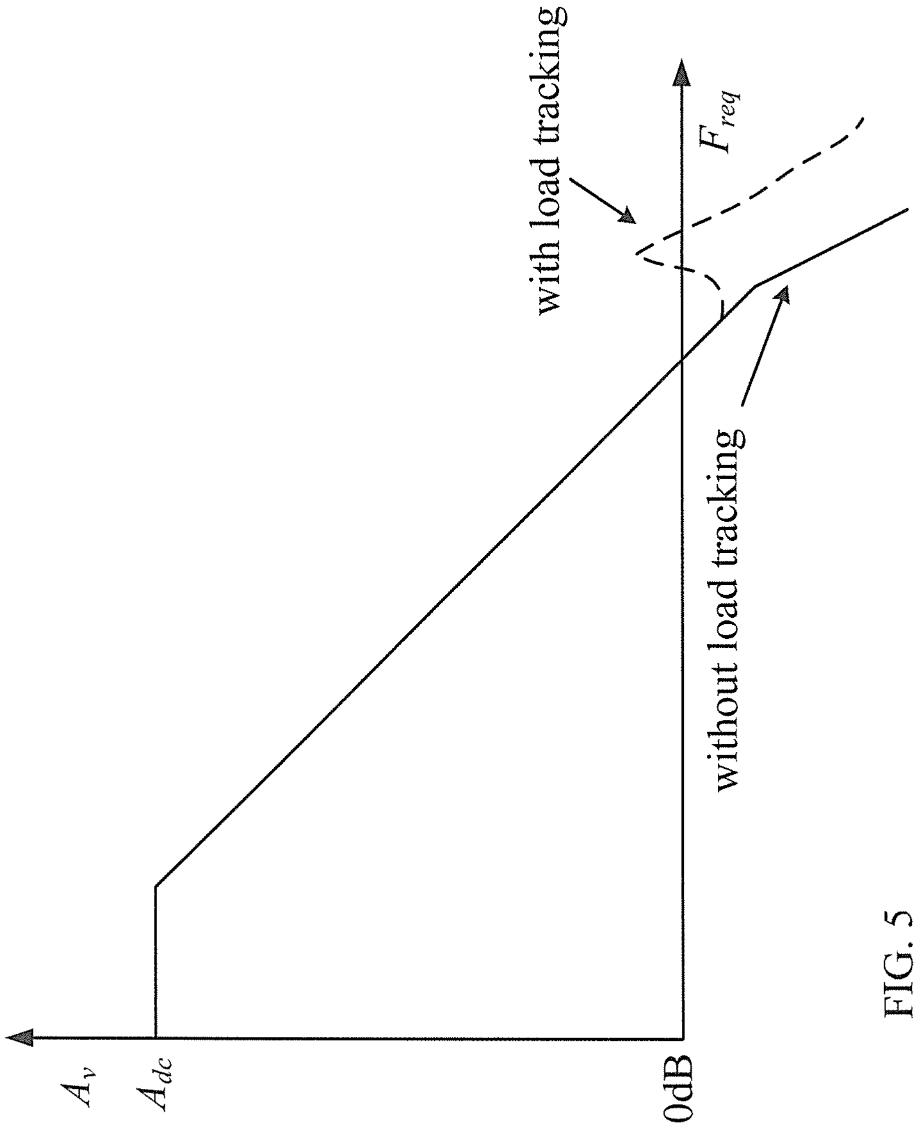
FIG. 5 illustrates a Bode plot of a frequency response of a current loop of an LDO according to an embodiment of the present invention.

FIG. 5 illustrates a Bode diagram of a frequency response of a current loop of an LDO according to an embodiment of the present invention. Included in FIG. 5 is a comparison of frequency response waveforms between presence and absence of load current tracking and compensation. There are two (2) poles in the current loop, while the damping factor is controlled by the capacitors $C_{m1}$ and $C_{m2}$ (FIG. 2). As a large load is connected, a frequency peak will appear after the unit gain frequency in case there's only fixed Miller capacitance instead of load tracking and compensation in the current loop, and thus the operation of the close loop goes unstable. In one embodiment of the LDO 100, an adjustable Miller capacitance is formed by the fixed capacitor $C_{m1}$ and the controllably connected capacitor $C_{m2}$, in such a way that the compensation loop can track the non-dominant pole and eliminate the frequency peak, while stabilizing the loop operation.

Figure 6:
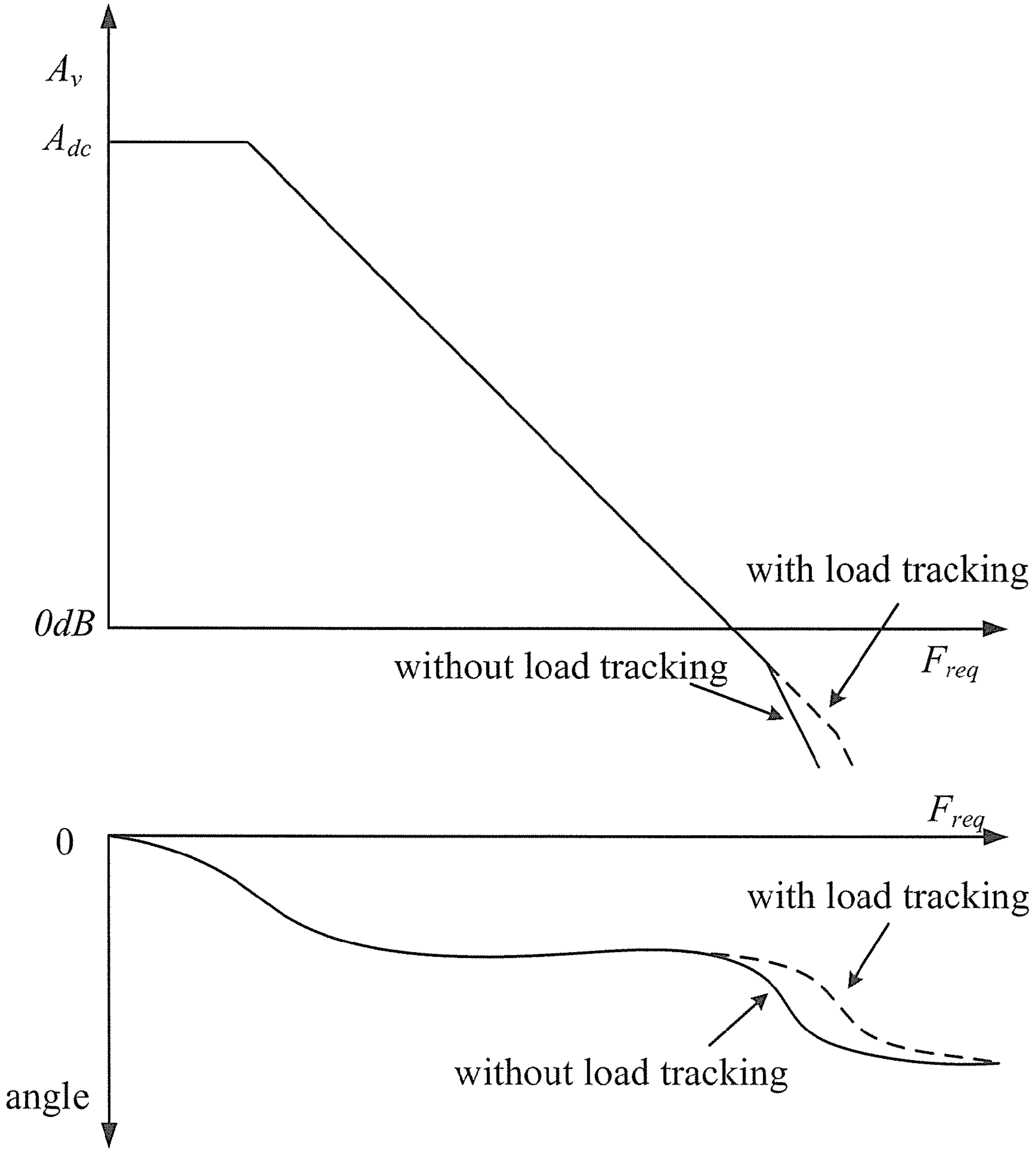
FIG. 6 illustrates a Bode plot of frequency compensation of a voltage loop of an LDO according to an embodiment of the present invention.

Referring to FIG. 6, a Bode diagram of a frequency compensation of a voltage loop of an LDO according to an embodiment of the present invention is illustrated. Being similar to those shown in FIG. 5, included in FIG. 6 is a comparison of the frequency responses between presence and absence of load current tracking and compensation. If a fixed Miller capacitance is incorporated in the circuit, the phase margin of the voltage loop will be relatively low. Through the adjustable Miller compensation capacitor, the voltage loop stability is improved, which is especially distinctive when a light load is connected.

According to the LDO of an embodiment of the present invention, the unit gain bandwidth of the system is:

$$GBW = \frac{g_{in} * g_p * r_{o1}}{C_L}$$

where $g_m$ is the input stage transductance, $g_p$ is the output stage transconductance, $r_{ol}$ is the output impedance, and $C_L$ is the load capacitance.

The non-dominant pole of the LDO is:

$$P_{nd} = \frac{1}{r_{o1} * C_m}$$

where $C_m$ is the miller capacitance in the Miller compensation.

It can then be concluded that the phase margin of the system is:

$$PM = \frac{180}{\pi}\tan^{-1}\left(\frac{P_{nd}}{GBW}\right) \propto \tan^{-1}\left(\frac{1}{C_m}\right)$$

It can be seen from the above that, if the compensation capacitance $C_m$ is too high, when a light load is connected, the phase margin will drop and impact the system stability. The LDO according to the present invention switches off the switching element $T_{sw}$ when the light load is connected, thereby ensuring a relatively small capacitor is connected at that time.

Figure 7:
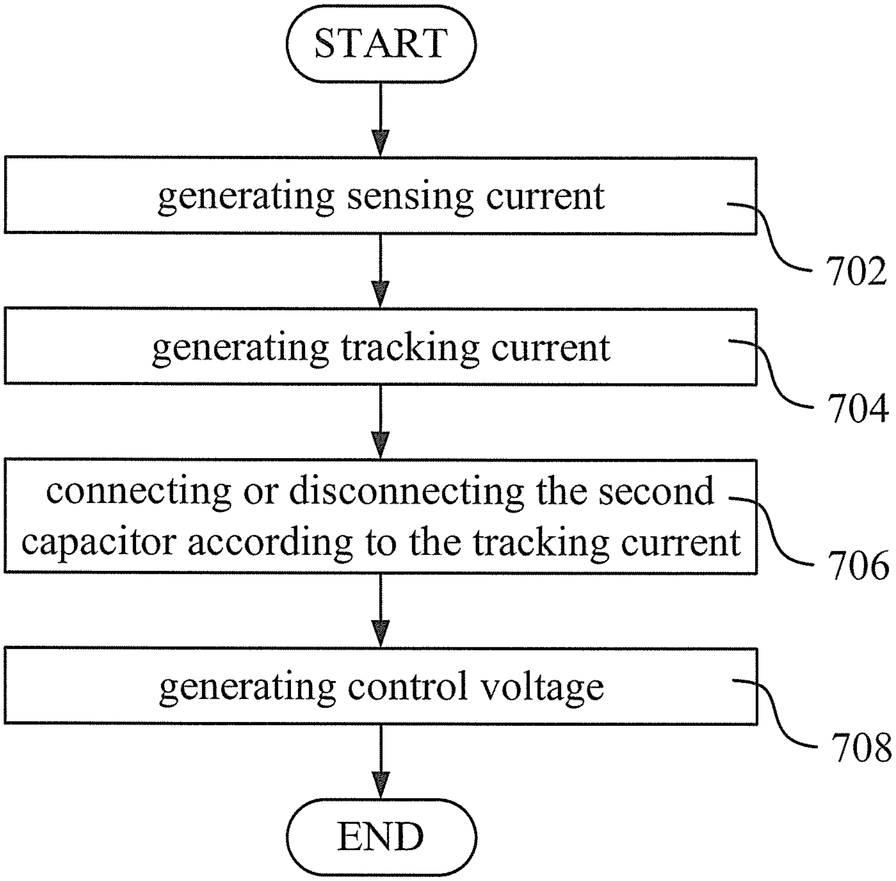
FIG. 7 is a flow chart of a method for tracking and compensating load current of an LDO according to an embodiment of the present invention.

FIG. 7 is a flow chart of a method for load current tracking in an LDO in accordance with an embodiment of the present invention. For easy description, the flow is described hereinafter with reference to the LDO 100 illustrated in FIGS. 1 and 2.

A sensing current is generated in block 702. Specifically, referring to the LDO 100 in FIGS. 1 and 2, the current mirror circuit 162 is used as a mirror to the output circuit 104, and the current mirror circuit 162 provides the sensing current $I_{sns}$ based on the output current $I_{out}$ provided by the output circuit 104.

A tracking current is generated in block 704. In accordance with the LDO 100, the track generation circuit 166 is used for receiving the sensing current $I_{sns}$ and providing the tracking current $I_{track}$.

In block 706, connection or disconnection of the second capacitor to the first capacitor in parallel is controlled using the tracking current. The switching element $T_{sw}$ receives the tracking current $I_{track}$ and is switched on or off accordingly, such that the second capacitor $C_{m2}$ connects or disconnects to the circuit, and accordingly, a parallel connection with the first capacitor $C_{m1}$ is formed or not. More specifically, the switching element $T_{sw}$ may comprise a switching transistor, where the gate terminal of the switching transistor is connected to receive the tracking current $I_{track}$. The switching transistor is conductive or shutoff according to the tracking current $I_{track}$, such that the connected second capacitor $C_{m2}$ is connected or disconnected in parallel with the first capacitor $C_{m1}$.

A control voltage is generated in block 708. The current compensation circuit 204 generates the control voltage $V_{ctrl}$ through the control current $I_{ctrl}$.

It will be understood that the frequency response of the LDO is impacted with the variation of the output current due to the connection of the load to the LDO. In order to release the LDO from the impact to its output current due to the connected load and stabilize the frequency response, corresponding compensation is required in the current loop. The LDO of the present invention adjusts the Miller compensation using a controllably connectable capacitor instead of the conventional Miller compensation with a fixed capacitor, and further controls the compensation extent to the circuit. Further, the control of the compensation is based on the output current feedback in connections with loads, the compensation is accordingly adaptive and reflects the compensation requirement of the LDO itself. The LDO of the present invention implements an adaptive control to the current compensation and improves the frequency response characteristics as well as system stability.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

Preferred embodiments are described herein, including the best mode known to the inventor for carrying out the claimed subject matter. Of course, variations of those preferred embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

The invention claimed is:

1. A low drop-out voltage regulator, comprising:

an error amplifier having a non-inverting input terminal, an inverting input terminal and an output terminal, wherein one of the non-inverting input terminal and the inverting input terminal is connected to a reference voltage;

an output circuit connecting the output terminal of the error amplifier to an external load, wherein the output circuit generates an output current and an output voltage for the external load;

a current tracking circuit coupled to the output circuit, wherein the current tracking circuit receives the output current and generates a tracking current that tracks the output current; and a load tracking-compensation circuit coupled to the current tracking circuit and the output circuit, wherein the load tracking-compensation circuit generates a control voltage based on the tracking current and provides the control voltage to the output circuit, wherein the current tracking circuit comprises a current mirror circuit that mirrors the output circuit and generates a sensing current that mirrors the output current, and a track generation circuit that receives the sensing current and generates the tracking current therefrom.

2. The voltage regulator of claim 1, wherein the output circuit comprises a transistor, and wherein the output terminal of the error amplifier is coupled to a gate terminal of the transistor, and one of a source terminal and a drain terminal of the transistor is configured to provide the output current and the output voltage.

3. The voltage regulator of claim 1, further comprising a voltage feedback circuit coupled to the output circuit for receiving the output voltage, wherein the voltage feedback circuit samples the output voltage and generates a sampled voltage, and provides the sampled voltage to one of the non-inverting input terminal and the inverting input terminal of the error amplifier.

4. The voltage regulator of claim 1, wherein:

the output circuit comprises an output transistor and the current mirror circuit comprises a mirror transistor, wherein gate terminals of the output transistor and the mirror transistor are coupled together, and one of a source terminal and a drain terminal of the mirror transistor outputs the sensing current; and the track generation circuit comprises a third transistor and a fourth transistor, wherein gate terminals of the third and fourth transistors are coupled together, and one of a source terminal and a drain terminal of the third transistor receives the sensing current, and one of a source terminal and a drain terminal of the fourth transistor provides the tracking current.

5. The voltage regulator of claim 1, wherein the current tracking circuit further comprises an amplifier circuit that receives the sensing current generated by the current mirror circuit, and generates a corresponding feedback-control voltage.

6. The voltage regulator of claim 5, wherein the amplifier circuit comprises a first transistor and a second transistor, wherein gate terminals of the first and second transistors are coupled together, one of a source terminal and a drain terminal of the first transistor is coupled to an output terminal of the output circuit, while the other is coupled to the gate terminal of the first transistor, and one of a source terminal and a drain terminal of the second transistor is coupled to a terminal of the current mirror circuit that outputs the sensing current, while the other is configured to provide the feedback-control voltage.

7. The voltage regulator of claim 1, wherein the load tracking-compensation circuit comprises a current compensation circuit having a first capacitor, a second capacitor, and a switching circuit, wherein the second capacitor and the switching circuit are connected in series with each other and in parallel with the first capacitor, and wherein the switching circuit receives the tracking current and is controllably switched using the tracking current.

8. The voltage regulator of claim 7, wherein the switching circuit comprises a switching transistor, wherein a gate terminal of the switching transistor is coupled with the current tracking circuit, and one of a source terminal and a drain terminal of the switching transistor is coupled to the second capacitor, while the other is coupled to the first capacitor.

9. The voltage regulator of claim 7, wherein the current compensation circuit further comprises a sixth transistor and a seventh transistor with gate terminals thereof coupled together, wherein one of a source terminal and a drain terminal of the sixth transistor is coupled to the gate terminal of the sixth transistor, while the other is coupled to one of a source terminal and a drain terminal of the seventh transistor, and wherein the other of the source terminal and the drain terminal of the seventh transistor receives the control voltage.

10. The voltage regulator of claim 1, wherein the current tracking circuit also generates a feedback-control voltage corresponding to the output current, and wherein the load tracking-compensation circuit further comprises a current feedback circuit that, based on the feedback-control voltage, forms a current feedback loop for the voltage regulator.

11. The voltage regulator of claim 10, wherein the current feedback circuit comprises a feedback transistor having a gate terminal that receives the feedback-control voltage, and wherein a capacitor is connected between said gate terminal and one of a source terminal and a drain terminal of the feedback transistor.

12. The voltage regulator of claim 11, wherein the current feedback circuit further comprises an eighth transistor coupled between an output terminal of the feedback transistor and the control voltage, and wherein source and drain terminals of the eighth transistor are respectively coupled to the output terminal of the feedback transistor and the control voltage.

13. The voltage regulator of claim 12, wherein a resistor is coupled between the source and drain terminals of the eighth transistor.

14. The voltage regulator of claim 12, wherein the current feedback circuit further comprises a ninth transistor, wherein a gate terminal of the ninth transistor is coupled to a gate terminal of the eighth transistor, and one of a source terminal and a drain terminal of the ninth transistor is coupled to the gate terminal thereof while the other is coupled to a terminal of the eighth transistor that is connected to the control voltage.

15. A method for tracking and compensating load current of a low drop-out voltage regulator, wherein the low drop-out voltage regulator comprises an error amplifier and an output circuit, the method comprising:

receiving an output current of the output circuit;

generating a tracking current that tracks the output current; and generating a control voltage based on the tracking current, and providing the control voltage to the output circuit, wherein said receiving an output current of the output circuit, and generating a tracking current that tracks the output current further comprise:

mirroring the output circuit using a current mirror circuit that generates a sensing current that mirrors the output current; and receiving the sensing current by a track generation circuit, and generating the tracking current therewith.

16. The method of claim 15, wherein said generating the control voltage based on the tracking current, and providing the control voltage to the output circuit comprises:

connecting, in parallel, a first capacitor with a serial connection of a second capacitor and a switching circuit, to receive the tracking current;

switching the switching circuit based on the tracking current to connect and disconnect the first capacitor in parallel with the second capacitor, thereby forming a current compensation circuit; and basing on a reference voltage, providing the control voltage to the current compensation circuit.

17. The method of claim 16, wherein switching the switching circuit based on the tracking current comprises:

using a transistor as the switching circuit, and receiving the tracking current at a gate terminal of the transistor;

coupling one of a source terminal and a drain terminal of the transistor to the second capacitor; and coupling the other of the source terminal and the drain terminal of the transistor to the first capacitor.

18. A method for tracking and compensating load current of a low drop-out voltage regulator, wherein the low drop-out voltage regulator comprises an error amplifier and an output circuit, the method comprising:

receiving an output current of the output circuit;

generating a tracking current that tracks the output current;

generating a control voltage based on the tracking current, and providing the control voltage to the output circuit;

providing a feedback-control voltage based on the output current; and based on the feedback-control voltage, forming a current feedback loop for the voltage regulator through the control voltage.

* * * * *